US010603940B2

(12) United States Patent
Markies et al.

(10) Patent No.: US 10,603,940 B2
(45) Date of Patent: Mar. 31, 2020

(54) AQUEOUS INKJET PRIMERING COMPOSITION PROVIDING BOTH PINNING AND INK SPREADING FUNCTIONALITY

(71) Applicant: Océ-Technologies B.V., Venlo (NL)

(72) Inventors: Peter R. Markies, Venlo (NL); Jozef P. Moonen, Venlo (NL); Peter O. Colin, Venlo (NL); Roy W. N. Evers, Venlo (NL); Franciscus J. H. M. Van Den Beucken, Venlo (NL); Ke Peng, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 90 days.

(21) Appl. No.: 15/938,893

(22) Filed: Mar. 28, 2018

(65) Prior Publication Data

US 2018/0222234 A1    Aug. 9, 2018

Related U.S. Application Data

(63) Continuation of application No. PCT/EP2016/073288, filed on Sep. 29, 2016.

(30) Foreign Application Priority Data

Oct. 5, 2015 (EP) .................................. 15188315

(51) Int. Cl.
*B41M 5/00* (2006.01)
*C09D 11/30* (2014.01)
(Continued)

(52) U.S. Cl.
CPC ........... *B41M 5/0017* (2013.01); *C09D 11/30* (2013.01); *C09D 11/38* (2013.01); *C09D 11/54* (2013.01);
(Continued)

(58) Field of Classification Search
CPC ............. B41M 5/0017; B41M 5/0011; B41M 5/0047; B41M 7/00; B41M 7/0072;
(Continued)

(56) References Cited

U.S. PATENT DOCUMENTS 5,985,424 A    11/1999    DeMatte et al.
6,471,347 B1   10/2002    Koitabashi et al.
(Continued)

OTHER PUBLICATIONS

International Search Report for PCT/EP2016/073288 (PCT/ISA/210) dated Nov. 3, 2016.
(Continued)

*Primary Examiner* — Manish S Shah
(74) *Attorney, Agent, or Firm* — Birch, Stewart, Kolasch & Birch, LLP

(57) ABSTRACT

The present invention relates to a pre-treatment liquid providing improved spreading property when printing an ink-jet image, as well as an ink-jet printing method comprising applying the pre-treatment liquid of the invention on a recording medium prior to printing an ink-jet image and a method of pre-treating a recording medium, comprising pre-treating a recording medium with the pre-treatment liquid of the invention. With the present pre-treatment liquid a combination an improved spreading of the ink on the pre-treated recording medium can be achieved.

13 Claims, 4 Drawing Sheets

(51) Int. Cl.

| | | |
|---|---|---|
| *C09D 11/38* | (2014.01) | |
| *C09D 11/54* | (2014.01) | |
| *C08F 212/08* | (2006.01) | |
| *C08F 226/10* | (2006.01) | |
| *C09D 125/08* | (2006.01) | |
| *C09D 139/04* | (2006.01) | |
| *C09D 139/06* | (2006.01) | |
| *C09D 153/00* | (2006.01) | |

(52) U.S. Cl.
CPC ......... *C09D 125/08* (2013.01); *C09D 139/04* (2013.01); *C09D 139/06* (2013.01); *C09D 153/00* (2013.01); *C09D 153/005* (2013.01)

(58) Field of Classification Search
CPC ..... B41M 5/52; B41M 5/5218; C09D 153/00; C09D 153/005; C09D 139/04; C09D 139/06; C09D 11/30; C09D 11/38; C09D 11/54; C09D 125/08; C09D 11/36; C09D 11/40; C09D 11/32; C09D 11/322; C09D 11/324; C09D 11/328; C09D 11/101; C09D 11/102; C09D 11/005; C09D 11/52; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045

See application file for complete search history.

(56) References Cited

U.S. PATENT DOCUMENTS

| | | | |
|---|---|---|---|
| 2002/0067402 A1* | 6/2002 | Nishita | B41J 2/2114 |
| | | | 347/102 |
| 2005/0225616 A1 | 10/2005 | O'Donnell et al. | |
| 2006/0293410 A1 | 12/2006 | Tokita et al. | |
| 2007/0054981 A1 | 3/2007 | Yanagi et al. | |
| 2008/0092309 A1 | 4/2008 | Ellis et al. | |
| 2010/0003417 A1 | 1/2010 | Arai et al. | |
| 2010/0075052 A1* | 3/2010 | Irita | B41M 5/0017 |
| | | | 427/288 |
| 2012/0268536 A1* | 10/2012 | Saito | B41J 2/2107 |
| | | | 347/96 |
| 2012/0314000 A1 | 12/2012 | Sarkisian et al. | |
| 2014/0078217 A1 | 3/2014 | Ingle et al. | |
| 2014/0362137 A1 | 12/2014 | Mann et al. | |

OTHER PUBLICATIONS

Search Report for European Patent Application No. 15188315, completed on Mar. 29, 2016.

Written Opinion of the International Searching Authority for PCT/EP2016/073288 (PCT/ISA/237) dated Nov. 3, 2016.

* cited by examiner

AQUEOUS INKJET PRIMERING COMPOSITION PROVIDING BOTH PINNING AND INK SPREADING FUNCTIONALITY

CROSS REFERENCE TO RELATED APPLICATIONS

This application is a Continuation of PCT International Application No. PCT/EP2016/073288, filed on Sep. 29, 2016, which claims priority under 35 U.S.C. 119(a) to Patent Application No. 15188315.4, filed in European Patent Office on Oct. 5, 2015, all of which are hereby expressly incorporated by reference into the present application.

FIELD OF THE INVENTION

The present invention relates to a pre-treatment liquid providing improved spreading property when printing an ink-jet image, as well as an ink-jet printing method comprising applying the pre-treatment liquid of the invention on a recording medium prior to printing an ink-jet image and a method of pre-treating a recording medium, comprising pre-treating a recording medium with a pre-treatment liquid of the invention.

BACKGROUND ART

For improving image quality in ink-jet printing, primer compositions have been used to improve the interaction between the recording medium and the inks.

Primer compositions normally contain salt compositions with acidic and/or electrophilic properties in order to destabilize pigment color particles. As a result, the behaviour of the pigment particles upon drying of the printed medium is optimized. Uncontrollable ink drop coalescence ('puddling') and color bleed is prevented, and the optical color density improved.

U.S. Pat. No. 5,985,424 discloses an inkjet recording sheet comprising a cellulosic sheet support, e.g., paper, having on at least one surface thereof an inkjet coating comprising, in combination, a porous base coat having a high absorption capacity for absorbing the vehicle of an inkjet ink, and an ink receiving coat having a superior capacity for keeping the dyes in the ink on the surface with minimal spreading, tailing or blurring, to provide a sharp image.

US2008/0092309 pertains to inkjet printing on fabric and to a pretreatment solution for the fabric that allows high quality printing thereon. The aqueous pretreatment solution/emulsion comprises a nonionic latex polymer and a multivalent cationic salt.

In US2007/0054981, an ink set comprising an ink containing at least an organic pigment, a water-soluble organic solvent and water and a treating liquid which is applied to a recording medium before applying the ink to the recording medium and produces an agglomerate upon contact with the ink, the ink containing a low molecular weight dispersant having a molecular weight of 2000 or lower and polymer fine particles is described.

US 2006/0293410 discloses an ink set for an inkjet comprising an ink and a processing liquid, wherein at least one of the ink and the processing liquid contains a water-soluble non-linear polymer. The non-linear polymer has at least one selected from the group consisting of a branched structure, a cross linking structure and a mesh structure in a molecule.

Further, US 2005/0225616 describes an ink-jet printing process comprising the steps (a) and (b) in any order or simultaneously: (a) applying an ink to a substrate by means of an ink-jet printer to form an image on a substrate; and (b) applying to the substrate a fixing composition comprising a liquid medium and a polymer containing a plurality of monoguanide and/or biguanide groups by means of an ink jet printer; characterised in that in the fixing composition has a chloride concentration less than 400 ppm by weight.

In addition, ink sets and related methods are provided in US 2014/0362137. An ink set can comprise an ink including an ink colorant and an ink vehicle, the ink devoid of metal salt; a treatment fluid including a latex, the treatment fluid devoid of thickener and colorant; and a fixer fluid including a precipitating agent, the fixer fluid devoid of colorant.

Furthermore, US 2014/0078217 provides a method of inkjet printing on non-porous media comprising inkjet printing a fixer fluid on the non-porous media and inkjet printing an ink onto the non-porous media, where the printing of the ink is within 125 milliseconds of the printing of the fixer fluid. Thus, the ink is printed to contact the fixer fluid within 125 milliseconds of each being printed.

The pre-treatment composition for inkjet printing disclosed in US 2012/0314000 comprises: a liquid vehicle, a fixing agent, a non-ionic defoaming surfactant, a surface tension reducing surfactant, and a latex resin having an acid number of less than 20.

Another example of a processing liquid for ink printing is described in U.S. Pat. No. 6,471,347. The processing liquid containing an insolubilizer of polymer as the insolubilizer disclosed therein is thinned out at a relatively low printing ratio, i.e., at a given ratio relative to dots of a black ink and applied after the Bk ink is applied. Thereby, a reacting product is fixed in a part relatively shallow and close to the surface of a printing medium without diffusing deep into the medium and thus can increase optical density of a printed phi image. In this case, the fixation can be accelerated when the processing liquid is highly penetrative.

However, primering behaviour results in unwanted side effects: the spreading rate of the ink is reduced. The effects of unstable jetting (jetting angle defects) become more visible (streakiness effect), and more ink volume is needed to cover the medium surface.

As a result, the addition of a second functionality in primer compositions to increase ink spreading would be favourable. This additive must be compatible with the primer salt composition itself, and preferably not compromise both jetting behaviour and drying behaviour of the primer layer.

Therefore there is a need for a primer composition which enables a better spreading of ink droplets.

SUMMARY OF THE INVENTION

During investigations, the inventors found that the addition of a polymer dispersion of certain block copolymers to a primer composition enables a spreading improvement, i.e. an increase of the linewith of single pixel width lines, during printing an ink. It has been found that most latex compositions will improve ink spreading on a medium surface upon application as a undercoating. A specific class of latex block copolymers proved to be compatible with primer salt compositions, allowing combination in a single primer composition. These polymers contain both highly water soluble blocks and aliphatic/apolar blocks. Further, it was found that a steric stabilization of polymer particles by the water soluble block proves to be non-sensitive to high electrophilic salt concentrations.

In a first aspect, the present invention relates to a pre-treatment liquid comprising water, at least one multivalent cationic salt and/or at least one organic acid dissolved in the water, and at least one copolymer, wherein the at least one copolymer is a block-copolymer comprising hydrophilic and apolar parts and optionally having at least one hydrophilic end group.

Furthermore, the present invention relates in another aspect to an ink-jet printing method, comprising pre-treating a recording medium with the pre-treatment liquid of the invention, and printing an image with at least one ink on the pre-treated recording medium.

In addition, a method of pre-treating a recording medium comprising pre-treating a recording medium with the pre-treatment liquid of the invention is disclosed.

Further aspects and embodiments of the invention are disclosed in the dependent claims and can be taken from the following description, figures and examples, without being limited thereto.

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Figure 1:
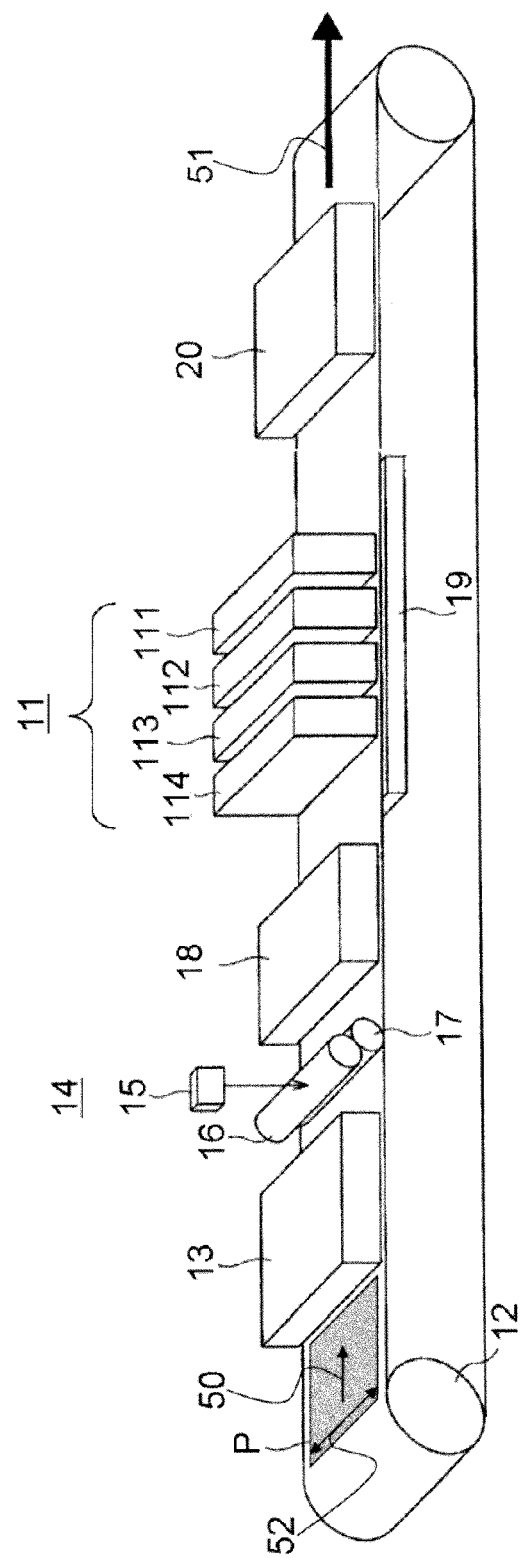
FIG. 1 shows a schematic representation of an inkjet printing system.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

In the present specification, amounts of a substance are usually given as mass percent (m %, wt %), unless noted otherwise or clear from the context.

In a first aspect, the present invention relates to a pre-treatment liquid comprising water, at least one multivalent cationic salt and/or at least one organic acid dissolved in the water, and at least one copolymer, wherein the at least one copolymer is a block-copolymer comprising hydrophilic and apolar parts and optionally having at least one hydrophilic end group.

In the pre-treatment liquid, the at least one multivalent cationic salt and/or at least one organic acid dissolved in the water, preferably a salt composition with acidic and/or electrophilic properties, is present to stabilize color pigments (normally having a negative charge at the pH of usual inks) during the printing process, thus leading to good printing properties. In the present invention, the at least one multivalent cationic salt and/or at least one organic acid dissolved in the water is not particularly limited, and those usually used in pre-treating liquids for ink-jet printing can usually be applied. For example, useful cationic salts include water-soluble salts of magnesium, calcium, strontium, barium aluminum, copper, iron, nickel and zinc, particularly magnesium and calcium, and examples of organic acids include malonic acid, arginic acid, citric acid, amino acids like glycine and glutamic acid, succinic acid, tartaric acid, oxalic acid, fumaric acid, phthalic acid, maleic acid, and malic acid. According to certain embodiments, the present pre-treatment liquid comprises at least one multivalent cationic salt, particularly of magnesium, like magnesium L-pidolate.

The at least one copolymer used in the present pre-treatment liquid is a block-copolymer comprising hydrophilic and apolar parts and optionally having at least one hydrophilic end group, but is not particularly limited apart from that. For example, it can have two or more hydrophilic end groups, that can be the same as or different from the hydrophilic parts in the block copolymer. The block copolymer can also comprise one or more hydrophilic and/or apolar parts which can originate from the same or different monomers. In contrast to a block-copolymer, no sufficient results can be obtained with a random copolymer.

According to certain embodiments, the at least one copolymer has at least one hydrophilic end group. Such a group facilitates interaction with the ink upon application. Without being bound to any theory, it is believed that the apolar part of the copolymer will form the core of the copolymer, particularly upon application to the recording medium, and the hydrophilic groups will interact with the surroundings. Further, hydrophilic and apolar parts of the copolymer can enhance interaction with the recording medium, e.g. with a hydrophobic recording medium through interaction with the apolar parts, with the hydrophilic parts improving interaction with the ink.

In the at least one copolymer the ratio of the hydrophilic parts and apolar parts is not particularly limited as long as at least both parts are present and form at least one hydrophilic and at least one hydrophobic block with a length of at least 10 monomers. According to certain embodiments, the molar amount of the hydrophilic monomers in the copolymer is less than 50%, preferably less than 40%, further preferably less than 35%. If the amount of hydrophilic monomers is too high, the at least one copolymer will be dissolved uniformly in the pre-treatment liquid, which can lead to a covering of the recording medium upon application of the cover liquid, impeding interaction of the recording medium with the ink.

The monomers used in the copolymer are not particularly limited as long as one is hydrophilic and one is apolar. In the present invention, the at least one copolymer in form of a block-copolymer comprising hydrophilic and apolar parts and optionally having at least one hydrophilic end group is used as a spreading modifying additive. According to certain embodiments, the at least one copolymer is compatible with the acidic/electrophilic primer salts. The monomers can form polymers using different polymerisation reactions, e.g. radical polymerisation, polycondensation, polyaddition, etc. The backbone of the polymers is not particularly restricted and can be e.g. based on vinyl groups or urethane groups, etc., but is preferably non-ionic. Preferably the polymer is obtained from a reaction of vinyl-based monomers forming a non-ionic backbone.

According to certain embodiments, the at least one copolymer comprises ring-containing substituents in the hydrophilic and/or apolar parts. With such ring-containing substituents, a steric stabilization of the at least one copolymer can be achieved. leading to improved distribution of the polymer on the recording medium. Examples of hydrophilic ring-containing monomers include e.g. vinylpyrrolidone, ring-containing vinyl ethers, vinyl caprolactam, vinyl imidazole, etc. Particularly useful is vinylpyrrolidone.

According to certain embodiments, the at least one copolymer comprises an apolar part comprises monomer comprising at least one aromatic ring, e.g. aromatic vinyl monomers like styrene. Apart from a benzene ring, like in styrene monomers, also other aromatic groups, e.g. toluene (like in methylstyrene) butylbenzene (like in butylstyrene, e.g. t-butylstyrene), naphthene, etc. can be used as substituents in vinyl monomers as suitable apolar monomers in the at least one copolymer. Styrene is particularly useful.

According to certain embodiments, the at least one copolymer is nonionic, so that it can withstand high salt concentrations in the pre-treatment liquid.

According to certain embodiments, the at least one copolymer is a linear polymer so that it can be distributed better in the pre-treatment liquid. Further, a linear polymer can form more uniform copolymer particles that can be distributed more homogeneously during the pre-treatment process and thus enable a sufficient and even spreading enhancement.

A preferable copolymer in the present pre-treatment liquid is a styrene-1-vinylpyrrolidone-block-copolymer, particularly with at least one vinylpyrrolidone end group. An exemplary styrene-1-vinylpyrrolidone-block-copolymer is shown in the following formula 1, wherein m/n is 29/71. Styrene-1-vinylpyrrolidone-block-copolymer has been particularly compatible also with high salt concentrations, and thus is very effective as a spreading agent in the present pre-treatment liquid.

Formula 1

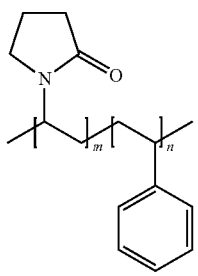

An exemplary combination of a copolymer and a multivalent cation in a pre-treatment liquid of the invention is poly(vinylpyrrolidone-co-styrene) and magnesium pidolate, e.g. in concentrations of 2.2 m % polymer (solid amount) and 18.5 m % magnesium pidolate, based on 100 m % of the pre-treatment liquid.

According to certain embodiment, the present pre-treatment liquid comprises the at least one copolymer in the form of particles. Using particles, the copolymer can be distributed evenly on a recording medium upon application. According to certain embodiments, the particles have a maximum diameter of less than 2 μm, particularly less than 1 μm, preferably less than 0.5 μm, more preferably less than 200 nm. Preferably, the particles are dispersed in the pre-treatment liquid According to certain embodiments, at least one, e.g. one, multivalent cationic salt is contained in a concentration of 10 to 30 m % with regard to the pre-treatment liquid, i.e. 100 m % pre-treatment liquid. It has been found that the at least one copolymer used in the present pre-treatment liquid can withstand high salt concentrations, making it possible to include a multivalent cationic salt in an amount that leads to particular improvement in the pre-treatment, leading to improved printing quality when printing an image.

According to certain embodiments, the at least one copolymer is contained in a concentration of 0.1 to 25 m %, preferably in a range of 0.5 to 10 m %, further preferable in a range between 1 and 7.5 m %, with regard to the pre-treatment liquid, i.e. 100 m % pre-treatment liquid. When the amount of the at least one copolymer in the pre-treatment liquid is too low, the surface of the recording medium to be printed on cannot be effectively covered by the at least one copolymer, which can lead to a lower spreading improvement. When the amount of the at least one copolymer is too high, the copolymer might start touching and forming a network on the recording medium, which can lead to a reduced ink attachment during printing, e.g. also preventing ink from going into pores of the recording medium. According to certain embodiments, the at least one copolymer is present in the pre-treatment liquid in an amount lower than the amount of polymers in the ink(s), preferably much lower, so that it does not affect the image formation and image quality, but only the spreading of the ink. Without being bound to any theory, it is believed that the at least one copolymer in the pre-treatment liquid will go to random positions on the surface of a recording medium upon application, thus not covering it completely in sufficient amounts.

The present pre-treatment liquid can further comprise at least one cosolvent and/or at least one surfactant, e.g. for facilitating jetting. These are not particularly limited and can comprise those that are normally used in pre-treatment liquids. Particularly, the co-solvent is compatible and miscible with water. Further, the surfactant is preferably water-soluble. According to certain embodiments, the co-solvent and/or surfactant can comprise those that are usually used in ink-jet printing inks, like the ones described below with regard to the ink used in the present printing method. An exemplary useful co-solvent comprises for example glycerol or other solvents that can help provide sufficient viscosity and/or surface tension to the pre-treatment liquid so that it can spread evenly on the recording medium. Additionally, the one or more surfactant(s) can further help adjust the viscosity and/or surface tension of the pre-treatment liquid.

Additionally, also further components can be comprised in the present pre-treatment liquid, e.g. additives that are usually used in pre-treatment, respectively priming, liquids in ink-jet printing, for example pH regulators to prevent corrosion of the printing equipment, like Vantex amine additive, biocides, etc.

It is not excluded in the present invention that the pre-treatment liquid is separated into two or more different portions, e.g. one with the copolymer and one comprising the at least one multivalent cationic salt and/or at least one organic acid dissolved in the water, so that these two components can be applied separately to a recording medium. Other components of the present pre-treatment liquid can be sufficiently separated and/or added to one of these portions.

According to another aspect, the present invention relates to an ink-jet printing method, comprising pre-treating a recording medium with the pre-treatment liquid of the present invention, and printing an image with at least one ink on the pre-treated recording medium.

In the present printing method, the recording medium and the at least one ink are not particularly limited and any applied in common ink-jet printing processes can be used.

Recording/Receiving Media

Suitable recording media for use in a printing process using an ink or set of inks (e.g. Cyan, Magenta, Yellow and blacK, CMYK) according to the present invention are not particularly limited to any type. The receiving medium may be suitably selected depending on the intended application.

Suitable receiving media may range from strongly water absorbing media such as plain paper (for example Océ Red Label) to non-water-absorbing media such as plastic sheets (for example PE, PP, PVC and PET films). To optimize print quality, inkjet coated media are known, which media comprise a highly water absorbing coating.

Of particular interest in the context of the present invention are Machine Coated (MC) media (also known as offset coated media) and glossy (coated) media, particularly MC media. MC media are designed for use in conventional printing processes, for example offset printing and show good absorption characteristics with respect to solvents used in inks used in such printing processes, which are usually organic solvents. MC and glossy media show inferior absorption behavior with respect to water (worse than plain paper, better than plastic sheets), and hence aqueous inks. Such media are known in the art.

According to certain embodiments, the recording medium has a hydrophobic surface.

Ink

An ink composition used in the ink in the present method is not particularly limited and can e.g. comprise a water-dispersible resin, a water-dispersible colorant, water, a cosolvent, a surfactant and optionally other additives. Preferably, the ink is water-based. In the ink, the amount of each component is not particularly limited as long as a printing ink is obtained.

Water Dispersible Resin (Latex Resin)

Examples of the water-dispersible resin include synthetic resins and natural polymer compounds. Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins. Examples of the natural polymer compounds include celluloses, rosins, and natural rubbers.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.). Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.). acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl XK-15, NeoCryl X-151, NeoCryl XK-232, NeoCryl XK-234, NeoCryl XK-237, NeoCryl XK-238-NeoCryl XK-86. NeoCryl XK-90 and NeoCryl XK-95 However, the water-dispersible resin emulsion is not limited to these examples.

The water-dispersible resin may be used in the form of a homopolymer, a copolymer or a composite resin, and all of water-dispersible resins having a monophase structure or core-shell structure and those prepared by power-feed emulsion polymerization may be used.

Water-Dispersible Colorant

A water-dispersible colorant may be a pigment or a mixture of pigments, a dye or a mixture of dyes or a mixture comprising pigments and dyes, as long as the colorant is water-dispersible. The pigment is not particularly limited and may be suitably selected in accordance with the intended use.

Examples of the pigment usable include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I.

Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4. C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83. C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta). C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12. C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24. C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109. C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17. C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: C.I. Pigment Red 209, 224, 177. and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

Solvent

Water is cited as an environmentally friendly and hence desirable solvent.

Cosolvent

As a cosolvent of the ink, for the purposes of improving the ejection property of the ink or adjusting the ink physical properties, the ink preferably contains a water soluble organic solvent in addition to water. As long as the effect of the present invention is not damaged, there is no restriction in particular in the type of the water soluble organic solvent. Also, more than one cosolvent can be used in the ink used in the present invention.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, pentaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglycerol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol monopropyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Surfactants

It is preferable that the ink contains at least one surfactant in order to improve an ink ejection property and/or the wettability of the surface of a recording medium, and the image density and color saturation of the image formed and reducing white spots therein. Using surfactants, the surface tension, i.e. the dynamic surface tension as well as the static surface tension, can be adjusted.

Examples of surfactants are not specifically limited. The following can be cited.

Examples of the surfactant include nonionic surfactants, cationic surfactants, anionic surfactants, amphoteric surfactants, in particular betaine surfactants, silicone surfactants, and fluorochemical surfactants.

Examples of a cationic surfactant include: aliphatic amine salts, aliphatic quarternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an acetyleneglycol, an ethoxylated acetylene glycol, acetylene alcohol.

Examples of the fluorochemical surfactants include nonionic fluorochemical surfactants, anionic fluorochemical surfactants, and amphoteric fluorochemical surfactants. Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used. Examples of the commercially available products include SURFLON S-HI, S-112, S-113. S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants. The silicone surfactant may be suitably synthesized or commercial products may be used. Commercial products are readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like. The polyether-modified silicone surfactant is not particularly limited and may be suitably selected in accordance with the intended use.

As the polyether-modified silicone surfactant, commercial products may be used. Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348. BYK 349. BYK 3455, BYK-387 (produced by BYK Chemie GmbH); Tegowet 240, Tegowet 245, Tegowet 250, Tegowet 260 (produced by Evonik); Silwet L-77 (produced by Sabic).

All surfactants mentioned in this section may be used solely, or they may be used in combination.

Additives

The ink composition may optionally further contain additives like biozides or a penetrant, which is a compound that promotes absorption of the ink composition in the print medium, and the additives are not particularly limited and comprise those usually used in inks.

According to certain embodiments, the pre-treatment liquid is applied in an amount to achieve a thickness of the deposited wet film of 0.1 to 10 µm, preferably 1 to 7 µm, e.g. around 4 µm. If the thickness of the deposited wet film is too low, a suitable distribution of the at least one copolymer on the recording medium might be difficult to achieve. On the other hand, a too thick wet film can lead to a formation of a network of the at least one copolymer on the recording medium, leading to difficulties in achieving a sufficient spreading rate. Also, a too thick wet film will need bigger amounts of energy and longer time to dry, making the printing method less efficient.

According to certain embodiments, the pre-treatment liquid is essentially dried on the recording medium before the image is printed. An essential drying can be achieved if less than 5 m % of the solvents, e.g. water and/or cosolvents, of the pre-treatment liquid remain on the recording medium after drying and prior to printing the printing image, e.g. less than 2 m % or less than 1 m % of the solvents. According to certain embodiments, the pre-treatment liquid is dried on the recording medium before the (first) ink for printing the printing image is applied. The drying can be carried out in any way and is not particularly limited. For example, drying can be achieved by heaters and/or radiators, e.g. IR radiators, applied in a printing apparatus at and/or after an application unit for the pre-treatment liquid.

An exemplary printing process in an ink-jet printing apparatus of the present invention will now be described with reference to the appended drawings shown in FIG. 1 and FIG. 2. FIGS. 1 and 2 show schematic representations of an inkjet printing system and an inkjet marking device, respectively. However, the present ink-jet printing process and ink-jet printing apparatus are not limited to this exemplary embodiment.

FIG. 1 shows that a sheet of a recording medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g. sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g. clamping) and vacuum fixation. Of these vacuum fixation is preferred.

The printing process as described below comprises the following steps: media pre-treatment, image formation, drying and fixing and optionally post treatment.

Media Pre-treatment

To improve the spreading and pinning (i.e. fixation of pigments and water-dispersed polymer particles) of the ink on the recording medium, in particular on slow absorbing media, such as machine coated media, the recording medium is pre-treated, i.e. treated prior to printing an image on the medium. The pre-treatment step comprises the application of the pre-treatment liquid of the present invention and may further comprise one or more of the following:

preheating of the receiving medium to enhance spreading of the used ink on the receiving medium and/or to enhance absorption of the used ink into the receiving medium;

corona or plasma treatment.

Primer Pre-treatment

As an application way of the pre-treatment liquid, any conventionally known methods can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating (see 14 in FIG. 1) method is preferable because this coating method does not need to take into consideration ejection properties and it can apply the pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply the pre-treatment liquid to the entire surface of a coated printing paper, and roller coating can be preferably used as a coating method to the whole surface. The pre-treatment liquid may be an aqueous pre-treatment liquid.

Corona or Plasma Treatment

Corona or plasma treatment may be used as a pre-treatment step by exposing a sheet of a recording medium to corona discharge or plasma treatment. In particular when used on media like polyethylene (PE) films, polypropylene (PP) films, polyetyleneterephtalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbondioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Subsequently, a predetermined quantity of the present pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the recording medium P. Alternatively, the pre-treatment liquid can also be applied by one or more print heads. Subsequently, the coated printing paper P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range.

To prevent the transportation mechanism 12 being contaminated with pre-treatment liquid, a cleaning unit (not shown) may be installed and/or the transportation mechanism may be comprised of multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a recording medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

Figure 2A:
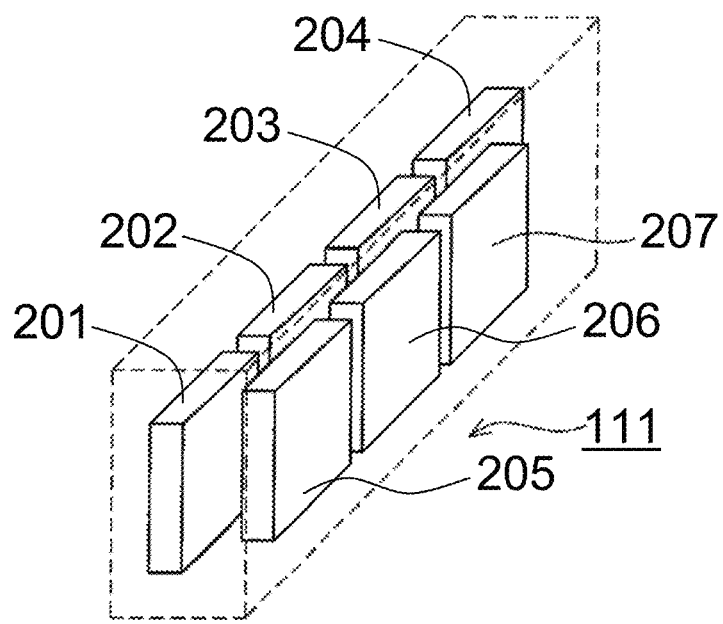
FIG. 2 shows a schematic representation of an inkjet marking device: A) and B) assembly of inkjet heads; C) detailed view of a part of the assembly of inkjet heads.
Figure 2B:
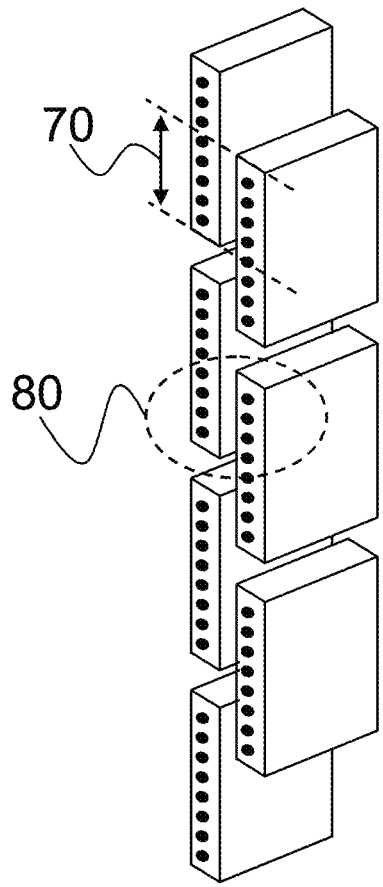
Figure 2C:
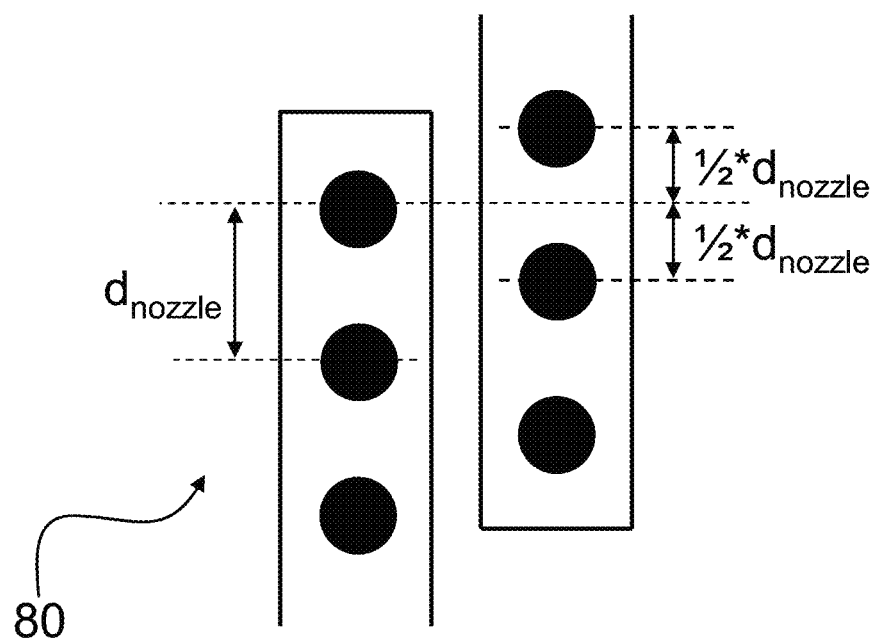

An inkjet marking device for use in single pass inkjet printing, 111, 112, 113, 114. has a length, L, of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the recording medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the recording medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the down stream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected recording medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Hitherto, the printing process was described such that the image formation step was performed in-line with the pre-treatment step (at least application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image, and the step or drying an fixing the printed image are performed. It is, however, preferable to carry out image formation with the above defined in-line image forming method.

In a further aspect, the present invention relates to a method of pre-treating a recording medium comprising pre-treating a recording medium with the pre-treatment liquid of the invention, e.g. as described with regard to the printing process.

EXAMPLES

Example 1

Materials

All materials used in the examples are used as obtained from the supplier, unless otherwise stated. The suppliers of the used materials are indicated in the specific examples.

The ink used was iQuarius Aqueous Pigment ink (Océ, Netherlands).

For the pre-treatment liquids, the following chemicals were used: Magnesium L-pidolate (98.0-102.0% calc. on dry substance, T), Glycerol (≥99.5%) and PVP Sty polymer (Poly(1-vinylpyrrolidone-co-styrene), 38% emulsion in water <0.5 μm particle size, CAS Number 25086-29-7) were obtained from SIGMA-ALDRICH. Dynol 607 was purchased from Air Products. Tomah surfactant was from Vivochem. UHQ water was obtained with purification system from Millipore MilliQ. All chemicals were used as received.

The Primer recipes, i.e. the components in the respective pre-treatment liquids, were as given in Table 1:

TABLE 1

Composition of pre-treatment liquids

|  | Control | Primer 1 | Primer 2 |
| --- | --- | --- | --- |
| Magnesium pidolate | 147.84 gram | 147.84 gram | 147.84 gram |
| Glycerol | 127.50 gram | 127.50 gram | — |
| Dynol 607 | 3.84 gram | 3.84 gram | 3.84 gram |
| Tomah surfactant | 12.72 gram | 12.72 gram | 12.72 gram |
| PVP Sty polymer | — | 36.40 gram* | 145.60 gram* |
| UHQ (ultra high quality) water | 508.10 gram | 471.70 gram | 490.00 gram |

*amount of dispersion

Primer Applying Method:

All the primers were applied to TCP gloss paper (Top Coated Pro Gloss obtained from Océ, Netherlands) by hand rodcoat bar (K Hand Coater, RK Print Coat Instruments, UK) with a wet film deposit lay thickness of 4 μm and then the primer layer was dried in air at room temperature overnight.

Ink Printing Test:

The above iQuarius Aqueous Pigment ink was used to print on top of the produced pre-primered TCP gloss papers using a standard printing process, wherein tests have been carried out for each of CMYK colours separately. The inks were printed separately on the pre-coated media and the obtained monochrome prints were analyzed for line spreading.

Figure 3:
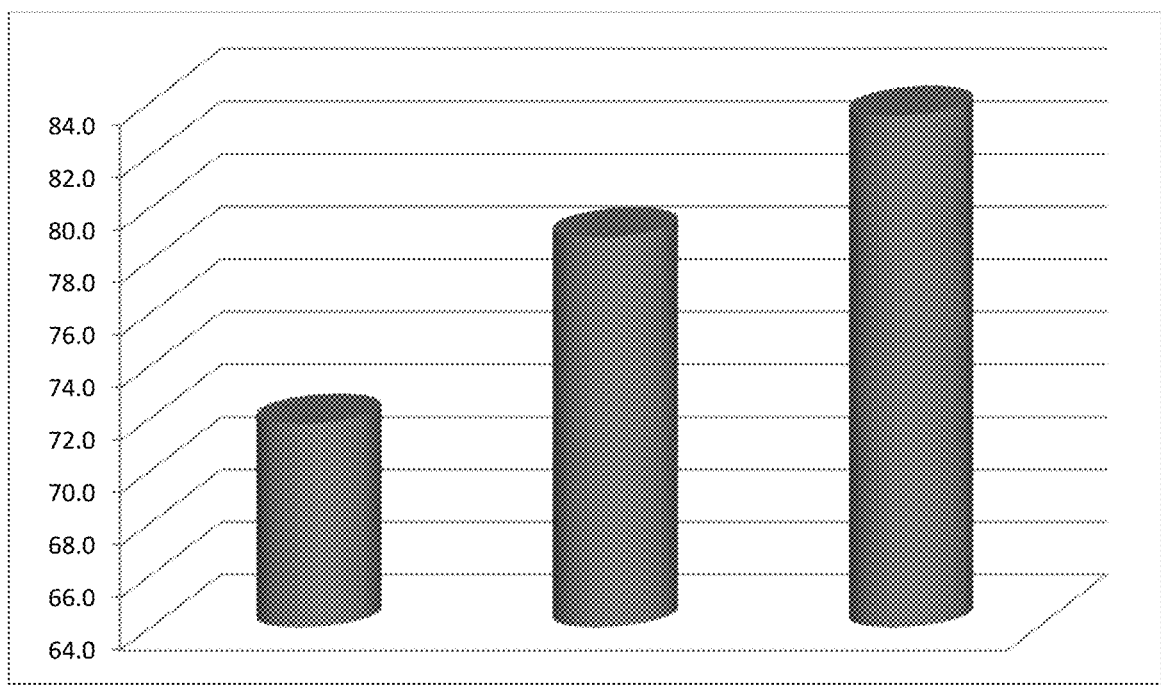
FIG. 3 shows the results obtained in Example 1.

Ink Spreading Rate Evaluated by 1 Pixel Line Width:

The ink spreading rate was then evaluated by measuring 1 pixel line width printed with cyan ink by using dotsize 4 of Kyocera KJ4B series print head using optical microscopy—including using a scanner for quantification, and the following results shown in FIG. 3 were obtained. As shown in FIG. 3, the 1 pixel line width of ink on top of Control primer (no PVP Sty polymer) is 71.8 μm (left column). With Primer 1, the width has been increased to 78.9 μm (middle column). Furthermore, the line width can be further increased by increasing the concentration of PVP Sty polymer as in Primer 2, which gives a line width of 83.5 μm (right column). Similar results were obtained for yellow, magenta and black ink.

This shows that the present pre-treatment liquid allows an improved spread rate, while a good pinning also could be achieved using high salt concentration in the pre-treatment liquid.

Comparative Example 1

Experiments have been carried out in the same way as in Example 1, except that the PVP Sty polymer was replaced with NEOCRYL BT107 (DSM), an acrylic polymer; AlberingkUSA® MAC 34, an acrylic polyurethane hybrid; Alberdingk boley uc300, a copolymer/aliphatic urethane; NeoRez® R-961 (DSM), a polyurethane; and Acronal LR8988 (BASF), a styrene/acrylic copolymer. While these showed spreading enhancement, they were not sufficiently compatible with the further components of the pre-treatment liquid, particularly a multivalent cation salt, particularly at higher concentrations.

With the present pre-treatment liquid a combination of pinning and spreading functionality within a single pre-treatment composition can be achieved, even in relatively high salt concentrations. Further, a better ink spreading will result in lowering of ink amounts used during printing, thus leading to improved ink-jet printing processes from an ecological as well as an economical point of view.

The invention claimed is:

1. A pre-treatment liquid comprising
water,
at least one multivalent cationic salt and/or at least one organic acid dissolved in the water, and
at least one copolymer,
wherein the at least one copolymer is a block-copolymer comprising hydrophilic and apolar parts and optionally having at least one hydrophilic end group,
wherein the at least one copolymer comprises ring-containing substituents in the hydrophilic and/or apolar parts.

2. The pre-treatment liquid of claim 1 wherein the at least one copolymer comprises an apolar part comprising at least one aromatic ring.

3. The pre-treatment liquid of claim 1, wherein the at least one copolymer is nonionic.

4. The pre-treatment liquid of claim 1, wherein the at least one copolymer further comprises positively charged groups.

5. The pre-treatment liquid of claim 1, wherein at least one multivalent cationic salt is contained in a concentration of 10 to 30 m % with regard to the pre-treatment liquid.

6. The pre-treatment liquid of claim 1, wherein the at least one copolymer is contained in a concentration of 0.1 to 25 m % with regard to the pre-treatment liquid.

7. The pre-treatment liquid of claim 1, wherein the at least one copolymer is a linear polymer.

8. The pre-treatment liquid of claim 1, further comprising at least one cosolvent and/or at least one surfactant.

9. An ink-jet printing method, comprising:
pre-treating a recording medium with a pre-treatment liquid of claim 1, and printing an image with at least one ink on the pre-treated recording medium.

10. The ink-jet printing method of claim 9, wherein the pre-treatment liquid is applied in an amount to achieve a thickness of the deposited wet film of 0.1 to 10 μm.

11. The ink-jet printing method of claim 9, wherein the pre-treatment liquid is essentially dried on the recording medium before the image is printed.

12. A method of pre-treating a recording medium, comprising pre-treating a recording medium with a pre-treatment liquid of claim 1.

13. A pre-treatment liquid comprising
water,
at least one multivalent cationic salt and/or at least one organic acid dissolved in the water, and
at least one copolymer,
wherein the at least one copolymer is a block-copolymer comprising hydrophilic and apolar parts and optionally having at least one hydrophilic end group,
wherein the at least one copolymer comprises ring-containing substituents in the hydrophilic and/or apolar parts, wherein the at least one copolymer is a styrene-1-vinylpyrrolidone-block-copolymer with at least one vinylpyrrolidone end group.

* * * * *